United States Patent
Moeller et al.

(10) Patent No.: US 8,830,974 B2
(45) Date of Patent: Sep. 9, 2014

(54) MOBILE ROUTER WITH RATE LIMITING

(75) Inventors: Douglas S Moeller, Santa Rosa, CA (US); Ronald W Pashby, San Francisco, CA (US)

(73) Assignee: Auto MFT Mobile, Inc., San Francisco, CA (US)

( * ) Notice: Subject to any disclaimer, the term of this patent is extended or adjusted under 35 U.S.C. 154(b) by 389 days.

(21) Appl. No.: 13/466,119

(22) Filed: May 8, 2012

(65) Prior Publication Data
US 2012/0257573 A1 Oct. 11, 2012

Related U.S. Application Data

(63) Continuation-in-part of application No. 12/514,049, filed as application No. PCT/US2007/011624 on May 15, 2007, now Pat. No. 8,189,552.

(60) Provisional application No. 60/800,749, filed on May 16, 2006, provisional application No. 60/800,679, filed on May 16, 2006, provisional application No. 60/800,750, filed on May 16, 2006.

(51) Int. Cl.
*H04W 4/00* (2009.01)
*H04W 84/00* (2009.01)
*H04L 29/08* (2006.01)
*H04W 8/06* (2009.01)

(52) U.S. Cl.
CPC ............. *H04L 67/06* (2013.01); *H04W 84/005* (2013.01); *H04W 8/06* (2013.01)
USPC ........... 370/338; 455/232; 455/405; 455/406; 455/407; 455/408; 455/409; 455/410; 455/432.1; 379/114.01; 379/114.02; 379/114.03; 379/114.04; 379/114.05; 379/114.07; 379/114.1; 370/328; 370/252

(58) Field of Classification Search
USPC ............. 379/114.01, 114.02, 114.03, 114.04, 379/114.05, 114.07, 114.1; 455/422.1, 232, 455/405–410; 370/338, 252, 328
See application file for complete search history.

(56) References Cited

U.S. PATENT DOCUMENTS

| | | | |
|---|---|---|---|
| 2003/0016636 A1* | 1/2003 | Tari et al. ....................... | 370/328 |
| 2005/0223114 A1* | 10/2005 | Hanson et al. ................ | 709/245 |
| 2006/0171356 A1* | 8/2006 | Gurelli et al. ................. | 370/329 |

* cited by examiner

*Primary Examiner* — Sharad Rampuria
*Assistant Examiner* — Sayed T Zewari
(74) *Attorney, Agent, or Firm* — Donald J. Lenkszus

(57) ABSTRACT

One embodiment of a mobile router, comprises: a wireless wide area network interface to access a cellular network and operable to receive downloaded data; a memory comprising a data rate limiting rule; and a processor. The processor is operable to generate usage data based on the quantity of the downloaded data during a predetermined time period, and is operable to control the data rate of downloaded data based on the usage data and the data rate limiting rule.

18 Claims, 8 Drawing Sheets

801 providing a plurality of wireless mobile routers 803 providing at least one server 805 download the corresponding data rate limiting rule 807 storing data rate limiting rule 809 download data at initial rate 811 determine accumulated quantity of downloaded data 813 utilizing data rate limiting rule to determine download data rate 815 control download data rate 817 determine if accumulated data reaches accumulate data quantity limit 819 download data at second data rate 821 determine if predetermined period ends 823 reset the accumulated data quantity

FIG. 8

901 download priority information and data rate configuration 903 storing priority information and data rate configuration information 905 determining the priority of download data;

906 monitoring the local area network interface 907 control data rate for the download data

MOBILE ROUTER WITH RATE LIMITING

CROSS-REFERENCE TO RELATED APPLICATIONS

The present application is a continuation-in-part of U.S. patent application Ser. No. 12/514,049 filed on Sep. 25, 2009 now U.S. Pat. No. 8,189,552 filed as PCT Application No. PCT/US07/11624 filed on May 15, 2007 and claiming priority to U.S. provisional application Ser. No. 60/800,749, filed May 16, 2006, U.S. provisional application Ser. No. 60/800,679, filed May 16, 2006 and claiming priority to U.S. provisional application Ser. No. 60/800,750, filed May 16, 2006.

FIELD OF THE INVENTION

The present invention relates to a networked vehicular wireless mobile router arrangement.

BACKGROUND

The use of mobile or wireless end-user computer-type devices has increased significantly. Such mobile devices must be able to connect to a wireless network. Wireless local area networks (LANs) are often deployed inside structures such as homes, offices, public and commercial buildings. A typical wireless LAN comprises one or more wireless access points, such as a wireless router or "hot spot", which communicates wirelessly with the mobile device, and allows the mobile device to connect to a wired network or other network that is also in communication with the access point. To stay connected to such a wireless LAN, the mobile device must usually stay within wireless communication range of the access points. This constrains the effective mobility of a wireless device.

The mobility constraining problem is particularly aggravated when the mobile device is disposed within a vehicle that is in motion. The mobility constraining problem has been addressed somewhat by use of cellular networks that allow mobile devices having cellular network interfaces to communicate wireless data with such cellular networks. However, most mobile computer devices do not have cellular network interfaces.

As the use of mobile devices has expanded, the mobility of such devices has expanded to the use wireless routers in vehicles. Such routers are referred to as "mobile routers" or "mobile nodes". Mobile routers typically permit a mobile device located in a vehicle that is in motion to maintain a connection to a wide area network and thereby greatly expand the mobility of the mobile device. Mobile routers are fully operable whether the vehicle having a mobile router installed therein is in motion or stationary. The mobile router may maintain connection to the Internet as it travels across cellular networks.

It is sometimes useful to be able to limit the amount of data throughput that a mobile router is capable of transmitting and receiving. Two reasons for doing this may be: a user has reached the limit of their data plan, so instead of charging more or shutting the user down, their connection is just slowed down; or the network is overloaded and it is necessary to ensure that the available bandwidth is more equally distributed.

In addition, when performing remote software updates to a mobile router or adding content to a mobile router it is desirable to do this in a manner that won't interfere with whatever reason abuser may be using the connection. In the embodiment, these updates may be happen in the background and the user should never notice.

SUMMARY

One embodiment of a mobile router, comprises: a wireless wide area network interface to access a cellular network and operable to receive download data; a memory comprising a data rate limiting rule; and a processor. The processor is operable to generate usage data based on the quantity of the download data during a predetermined time period and is operable to control the data rate of downloaded data based on the usage data and the data rate limiting rule.

The data rate limiting rule is received via the wide area network interface. The data rate limiting rule comprises a data quantity and a second data rate.

The processor operates the mobile router at a first data rate to receive downloaded data unless the usage data exceeds the data quantity during the predetermined time period. The processor operates the mobile router at the second data rate subsequent to the usage data exceeding the data quantity during the predetermined time period.

In one embodiment, the second data rate is slower than the first data rate.

One embodiment of a mobile router comprises: a wireless wide area network interface to access a cellular network to receive download data; a memory comprising a plurality of data rate limiting rules; and a processor operable to generate usage data based on the quantity of the downloaded data during a predetermined time period and operable to control the data rate of downloaded data based on the usage data and the plurality of data rate limiting rules.

The plurality of data rate limiting rules is received via the wide area network interface. The plurality of data rate limiting rules comprise at least a first data quantity and a corresponding second data rate, and a second data quantity and a third data rate.

The processor controls the data rate of downloading the download data at a first data rate unless the usage data exceeds the first data quantity during the predetermined time period. The processor controls the data rate of downloading the download data at the second data rate subsequent to the usage data exceeding the first data quantity during the predetermined time period.

In one embodiment, the second data rate is slower than the first data rate.

The processor controls the data rate of downloading the download data at the second data rate to receive the download data unless the usage data usage data exceeds the second data quantity during the predetermined time period. The processor controls the data rate of downloading the download at the third data rate subsequent to the usage data exceeding the second data quantity during the predetermined time period.

In the embodiment, the third data rate is slower than the second data rate.

One embodiment of a mobile router comprises: a wireless wide area network interface to access a cellular network; a data rate limiting rule; and a processor operable to utilize the data rate limiting rule to control the data rate of data transferred via the cellular network.

In the embodiment, the data rate limiting rule comprises one or more predetermined conditions for changing the data rate. The predetermined conditions comprise accumulated transferred data quantities.

The processor accumulates a total quantity of the transferred data, compares the accumulated total quantity to the accumulated transferred quantities, and utilizes the comparison to select a data rate for subsequent data transfers. The accumulated total quantity and the data rate are reset at the end of a predetermined period.

The processor controls the data rate at a first data rate until the data rate limiting rule is triggered. The processor accumulates a total quantity of the transferred data, compares the accumulated total quantity to the accumulated transferred quantities, and utilizes the comparison step to select a second data rate for subsequent data transfers. The second data rate is a predetermined slower data rate.

Another embodiment of a mobile router receives data services from a service provider via a cellular network provided by a cellular network carrier. The mobile router comprises: a wireless wide area network interface to access a cellular network; data rate information received from the service provider; and a processor operable to control the data rate of data transferred via the cellular network. The processor is operable to initially control the data rate at a first data rate and is operable to utilize the data rate information to determine the data rate of data subsequently transferred via the cellular network.

The data rate information comprises one or more data quantities and corresponding one or more second data rates. The processor is operable to accumulate the quantity of data transferred via the cellular network, compare the accumulated quantity to each of the one or more data quantities, and control the data rate of data transferred subsequent to the accumulated quantity exceeding one of the one or more data quantities to the corresponding one of the one or more second data rates.

The processor is operable at the end of a predetermined period to reset the data rate for subsequent data transfers to the first data rate. The predetermined period is a billing period determined by the service provider.

In one embodiment, a mobile router, comprises: a wireless wide area network interface to access a cellular network and operable to transfer data via the cellular network; a local area network interface to provide access to devices for transfer of data; first apparatus to monitor the wide area network interface to determine if data is being transferred; second apparatus to monitor the local area network interface to determine if data is being transferred; download data priority information; data rate configuration information; and third apparatus to control the data rate for downloaded data based on the priority and the data rate configuration information.

The data rate configuration information may be received via the wide area network interface. The download data priority information may also be received via the wide area network.

The mobile router may also comprise memory comprising the data rate configuration information and the download data priority information.

Each configuration information assigns one or more lower priorities to data downloads of one or more corresponding predetermined types and assigns a higher priority to data transfers initiated by a device coupled to the local area network interface.

In one embodiment, the third apparatus controls the data rate of the download data based on the priority information and the data rate configuration information when data is being transferred via the local area network interface. The third apparatus controls the data rate of the download data at a maximum data rate when data is not being transferred via the local area network interface.

One embodiment of a mobile router, comprises: a wireless wide area network interface to access a cellular network and operable to transfer data via the cellular network; a local area network interface to provide transfer of data to one or more devices; priority information for download data; data rate configuration information corresponding to the priority information; first apparatus to determine the priority of the download data; second apparatus to determine if data is transferred via the local area network interface; and third apparatus to control the data rate for the download data based on the priority information and the data rate configuration information.

The third apparatus further controls the data rate for the download data based on whether data is transferred via the local area network interface. The third apparatus controls the data rate for the download data to be a maximum data rate when no data is transferred via the local area network interface.

Each data download of one or more predetermined types is assigned one or more corresponding lower priorities. Data transfers comprising data of a second predetermined type with a device coupled to the local area network interface is assigned a higher priority.

The data rate configuration information is selected such that the data rates corresponding to the one or more lower priorities are slower that the data rate corresponding to the data transfers. The third apparatus controls the data rate for the download data to be a maximum data rate when no data is transferred via the local area network interface.

Another embodiment of a mobile router comprises: a wireless wide area network interface to access a cellular network and operable to transfer data via the cellular network; a local area network interface to provide transfer of data to one or more devices coupleable thereto; priority information and data rate configuration information corresponding to the priority information, the priority information; apparatus operable to determine the priority of data downloaded via said wide area network interface; monitor apparatus to monitor the local area network interface to determine if any of the one or more devices are coupled thereto; and control apparatus to control the data rate for the download data based on whether any one of the one or more devices are coupled to the local area network, the priority of said download data, the priority information and the data rate information.

The control apparatus controls the data rate of the download data to be a maximum data rate if none of the one or more devices are coupled to the local area network.

The control apparatus controls the data rate of the download data to be determined by the priority, the priority information and the data rate information if at least one of the one or more devices is coupled to the local area network.

Data downloads comprising a predetermined type have lower priorities.

In the embodiment, data downloads comprising one of software updates or added content have lower priorities.

One embodiment of operating a mobile router, comprises the steps of: transferring data via a cellular network at a data rate controlled by the router; receiving data rate information via the cellular network; and utilizing the data rate information to control the data rate of data subsequently transferred via the cellular network.

The data rate information comprises one or more predetermined conditions for changing the data rate. The predetermined conditions comprise accumulated transferred data quantities.

The method may further comprise the steps of: initially transferring the data at a first data rate, accumulating a total quantity of the transferred data, comparing the accumulated total quantity to the accumulated transferred quantities, and utilizing the comparison step to select a data rate for subsequent data transfers.

The method may comprise resetting the accumulated total quantity and the data rate at the end of a predetermined period.

Another embodiment of a method for operating a mobile router, comprises the steps of: receiving data services from a service provider via a cellular network provided by a cellular network carrier; controlling the data rate for transferring data via the cellular network; transferring data via the cellular network at a first data rate; receiving data rate information from the service provider; and utilizing the data rate information to control the data rate of data subsequently transferred via the cellular network.

In this embodiment, the data rate information comprises a data rate that is slower than the first data rate.

The method may further comprise receiving second data rate information from the service provider, and utilizing the second data rate information to control the data rate of new data subsequently transferred via the cellular network at the first data rate.

The data rate information may comprise one or more data quantities and corresponding one or more second data rates.

The method may comprise accumulating the quantity of data transferred via the cellular network, comparing the accumulated quantity to each of the one or more data quantities, controlling the data rate of data transferred subsequent to the accumulated quantity exceeding one of the one or more data quantities to the corresponding one of the one or more second data rates, and resetting the data rate for subsequent data transfers to the first data rate at the end of a predetermined period.

The predetermined period is a billing period determined by the service provider.

One embodiment of a method for operating a mobile router comprises: storing a data rate limiting rule in the router, downloading data via a cellular network, generating usage data based on the accumulated quantity of the downloaded data during a predetermined time period, and controlling the data rate of downloaded data based on the accumulated quantity and the data rate limiting rule.

Various embodiments may include the steps of receiving the data rate limiting rule via the cellular network, and downloading data via the cellular network at a first data rate.

In various embodiments, the data rate limiting rule comprises a predetermined data quantity and a second data rate.

In various embodiments, the method may include: downloading data at the second data rate after the accumulated quantity exceeds the predetermined quantity during a predetermined time period, and selecting the second data rate to be slower than the first data rate.

In various embodiments, the method may include: receiving a predetermined first command; and responding to the predetermined first command such that data is downloaded at a predetermined rate. The first command may be received via the cellular network.

The various embodiments may include receiving a predetermined second command; and responding to the predetermined second command to such that data is downloaded at the first rate.

In a further embodiment, a method for operating a mobile router, comprises: controlling the data rate at a first data rate for data transfers via the cellular network; receiving data rate information via the cellular network; and utilizing the data rate information to control the data rate of data subsequently transferred via the cellular network.

The data rate information comprises one of: a command to the router to change the data rate to a predetermined data rate, and one or more rate limiting rules based upon the accumulated quantity of data during a predetermined period.

The rate limiting rules are based upon a subscription data plan.

An embodiment of a method of operating a mobile router, comprising a wireless wide area network interface to access a cellular network and a local area network interface to provide access to devices for transfer of data is provided. The method comprises: storing priority information associated with predetermined types of download data and data rate information associated with the priority information; determining the priority of download data received via the wide area network interface; determining if data is being transferred via the local area network interface; and controlling the data rate for the download data based on the download data priority, the priority information, the data rate configuration information, and whether data is being transferred via the local area network interface.

The embodiment may also include one or more of the following steps: controlling the data rate of the download data based on the priority information and the data rate configuration information when data is being transferred via the local area network interface; setting the data rate of the download data at a maximum data rate when data is not being transferred via the local area network interface; storing the data rate configuration information and the priority information; and receiving priority information and the data rate configuration information via the wide area network interface.

In the embodiment, the priority information is selected such that data downloads of one or more predetermined types are assigned one or more corresponding lower priorities and data transfers initiated by a device coupled to the local area network interface is assigned a higher priority.

The embodiment may include controlling the data rate of the download data based on the priority information and the data rate configuration information when data is being transferred via the local area network interface; and controlling the data rate of the download data at a maximum data rate when data is not being transferred via the local area network interface.

Another embodiment of a method of operating a mobile router comprising a wireless wide area network interface to access a cellular network and operable to transfer data via the cellular network, and a local area network interface to provide transfer of data to one or more devices coupleable thereto is provided. The method comprises: storing priority information and data rate configuration information corresponding to the priority information; determining the priority of the download data; monitoring the local area network interface to determine if any of the one or more devices are coupled thereto; and controlling the data rate for the download data based on whether any one of the one or more devices are coupled to the local area network, priority, the priority information and the data rate information.

A method of operating a mobile router network in one embodiment comprises: providing a plurality of wireless mobile routers, each of the mobile routers comprises a wireless wide area network interface to access a cellular network, and each mobile router is operable to upload data and to download data via the cellular network; providing at least one server coupleable to the plurality of wireless mobile routers via the cellular network; operating each mobile router to determine, on an ongoing basis during a predetermined period, its corresponding accumulated quantity of downloaded data; and operating each mobile router to control its download data rate based on its corresponding the accumulated quantity of downloaded data.

The method may include the steps of storing in each mobile router a corresponding first data rate limiting rule; and utilizing in each mobile router the corresponding first data rate limiting rule to determine the mobile router download data rate.

The method may include operating the server to download the corresponding data rate limiting rule to each mobile router; and operating each the mobile router to store its corresponding data rate limiting rule;

The method may include providing each first data rate limiting rule as comprising an accumulated data quantity limit and a corresponding second data rate.

The method may include operating each mobile router to download data at a first data rate until the accumulated data quantity downloaded to the mobile router reaches the accumulated data quantity limit during a predetermined period; and operating each mobile router to download data at its corresponding second data rate after the accumulated data quantity downloaded to the mobile router reaches the accumulated data quantity limit during the predetermined period.

The method may include operating each mobile router to reset the accumulated data quantity downloaded at the end of the predetermined period.

Still further the method may include selecting the predetermined period to be the billing period for usage of the cellular network.

In another embodiment, a method of operating a mobile router network may comprise the steps of: providing a plurality of wireless mobile routers, each mobile router comprising a wireless wide area network interface to access a cellular network and each operable to control the data rate of data downloaded to the mobile router via the cellular network; providing at least one server coupleable to the plurality of wireless mobile routers via the cellular network; operating each mobile router to upload data and to download data via the cellular network; operating each mobile router to determine, on an ongoing basis during a predetermined period, its corresponding accumulated quantity of downloaded data; and operating each mobile router to control its download data rate based on its corresponding the accumulated quantity of downloaded data.

The method may comprise storing in each mobile router a corresponding plurality of data rate limiting rules; and utilizing in each mobile router the corresponding data rate limiting rules to determine the mobile router download data rate.

The method may comprise operating the server to download the corresponding data rate limiting rules to each the mobile router and operating each mobile router to store its corresponding data rate limiting rule.

The method may comprise providing each plurality of data rate limiting rules with a plurality of accumulated data quantity limits and a corresponding plurality of data rates.

The method may comprise operating each mobile router to download data at a first data rate until the accumulated data quantity downloaded to the mobile router exceeds a first one of the accumulated data quantity limits during a predetermined period; and operating each mobile router to download data at a slower data rate corresponding to one of the of the plurality of data rates after the accumulated data quantity downloaded to the mobile router exceeds a corresponding one of the plurality of accumulated data quantity limits.

The method may comprise operating each mobile router to download data at a first data rate until the accumulated data quantity downloaded to the mobile router exceeds a first one of the accumulated data quantity limits during a predetermined period; and operating each mobile router to download data at one of the plurality of data rates slower than the first rate based upon the accumulated data quantity limits and the corresponding data rates.

The method may comprise operating each mobile router to download data at the first data rate at the end of each the predetermined period.

The method may comprise operating each mobile router to automatically reset the accumulated quantity at the end of each the predetermined period.

The method may comprise selecting the predetermined period to be a billing period for usage of the cellular network.

In a further embodiment, a method of operating a mobile router network comprises: providing a plurality of wireless mobile routers; each of the mobile routers comprising a wireless wide area network interface to access a cellular network, each mobile routers operable to upload data and to download data via the cellular network; providing at least one server coupleable to the plurality of wireless mobile routers via the cellular network; operating the at least one server to selectively download to each of the mobile routers one or more corresponding predetermined data rates; operating each mobile router to control data throughput at a first data rate; and operating each mobile router to change its data throughput data rate from the first data rate to one of the one or more predetermined data rates upon the occurrence of a corresponding predetermined condition.

The method may comprise selecting the one or more second data rates to be slower than the first data rate.

The method may comprise operating the server to determine each corresponding predetermined condition.

The method may comprise selecting the corresponding predetermined condition to comprise a notification from the server to one or more mobile router of the plurality of mobile routers.

The method may comprise selecting the corresponding predetermined condition to comprise a predetermined accumulated data throughput quantity; operating each mobile router to accumulate data throughput quantity; and operating each mobile router to compare its accumulated data throughput quantity to the predetermined accumulated data throughput quantity.

The method may comprise: providing a plurality of wireless mobile routers; each of the mobile routers comprising a wide area network wireless interface to access a cellular network, each the mobile routers operable to upload data and to download data via the cellular network; operating each mobile router to control its data throughput via the cellular network at a first data rate; providing at least one server coupleable to the plurality of wireless mobile routers via the cellular network; operating the server to selectively download to each of the mobile routers one or more corresponding predetermined data rates; and operating each mobile router to change its data throughput data rate from the first data rate to one of the one or more predetermined data rates upon the occurrence of a corresponding predetermined condition.

The method may comprise selecting the one or more predetermined data rates are each selected to be slower than the first data rate.

The method may comprise operating the server to determine each the corresponding predetermined condition.

The method may comprise selecting the corresponding predetermined condition to comprise a notification from the server to one or more mobile router of the plurality of mobile routers.

The method may comprise selecting the corresponding predetermined condition to comprise a predetermined accumulated data throughput quantity; operating each mobile router to accumulate data throughput quantity; and operating each mobile router to compare its accumulated data throughput quantity to the predetermined accumulated data throughput quantity.

BRIEF DESCRIPTION OF THE DRAWING

The invention will be better understood by reading the following detailed description in conjunction with the drawing figures in which like designators refer to like elements, and in which:

FIG. 8 illustrates method steps; and

FIG. 9 illustrates method steps.

DETAILED DESCRIPTION

Figure 1:
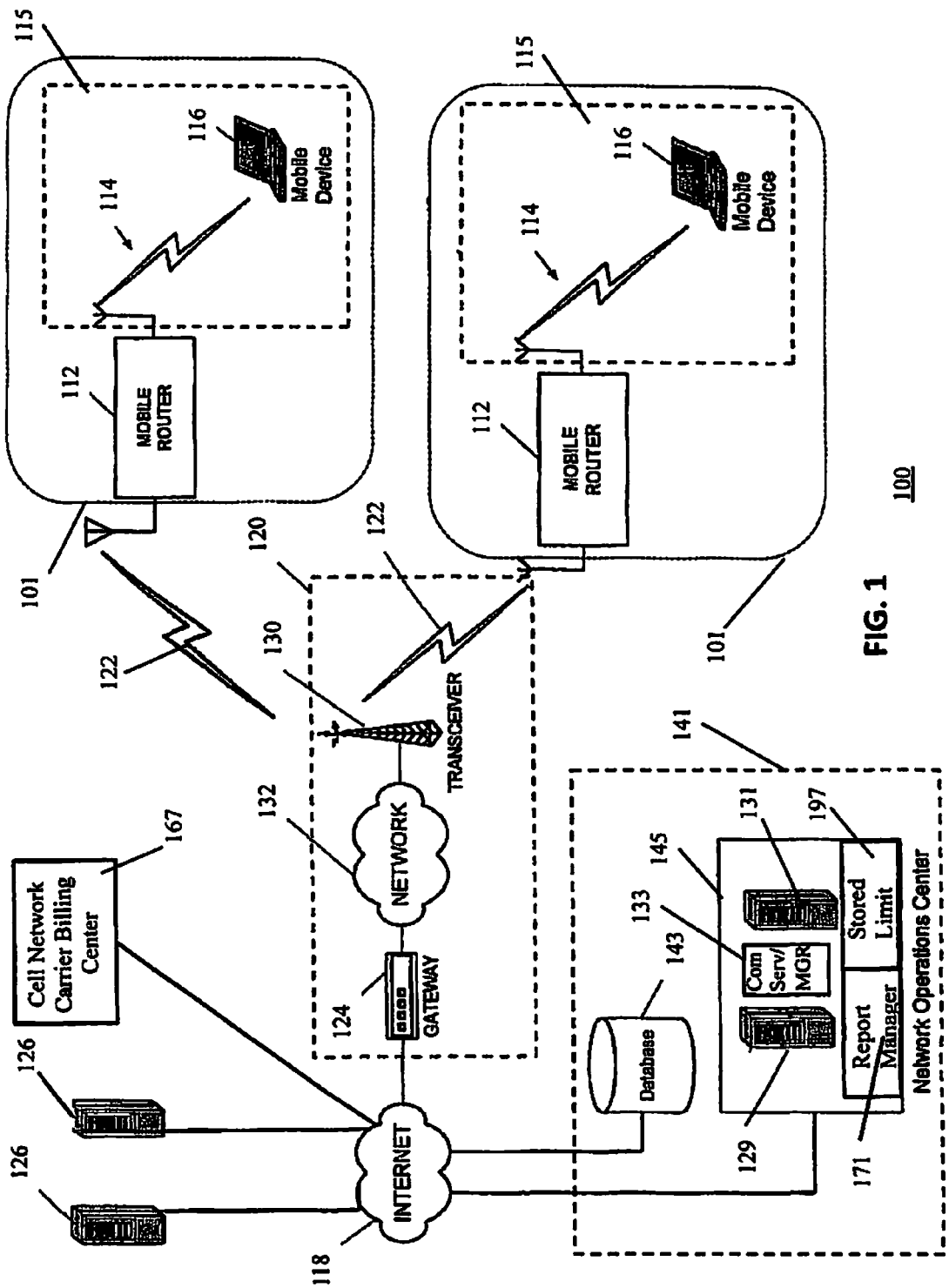
FIG. 1 is a block diagram of a first mobile router network arrangement.

FIG. 1 is a diagram of a mobile router network 100. Mobile router network 100 comprises a plurality of vehicles 101, each having therein a mobile router 112. Each vehicle 101 includes a wireless local area network 115. Each wireless local area network 115 may be in communication with one or more corresponding mobile devices 116 via a wireless communication link 114. Each wireless local area network 115 includes mobile router 112 and may or may not include one or more mobile devices 116. Each wireless local area network 115 may be, for example, a network compliant with industry standard IEEE 802.11 network, i.e., a Wi-Fi network, or a network compliant with industry standard IEEE 802.16, i.e., a WiMAX network, or a Bluetooth network, or any other suitable wireless network.

Each mobile device 116 may be any processor based device having a wireless transceiver capable of receiving and transmitting data via the wireless communication link 114. For example, one mobile device 116 may be a laptop (or notebook) computer equipped with a wireless network interface card, a wireless-enabled PDA, a pocket or palmtop computer, a Wi-Fi phone (e.g., a Skype phone or VoIP phone), a Wi-Fi appliance, a Sony PlayStation PSP or some other portable, network-enabled gaming station, a video screen, a digital camera, an audio player, a navigation device, a security camera, an alarm device, a wireless payment or POS device, or an automotive electronic device.

Mobile router 112 may act as a gateway between wireless network 115 and a backhaul network 20. In one embodiment, backhaul network 120 is a cellular wireless network. Backhaul network 120 in turn may be connected to the Internet 118 or any other network, such as an intranet or another WAN, via a gateway 24.

Mobile router 112 communicates with the backhaul network 120 via a backhaul wireless communication link 122. Backhaul wireless communication link 122 may be provided by a wireless network that is part of the backhaul network 120, such as a cellular wireless network. The cellular wireless network may be of any type.

Examples of such types of cellular network, include but are not limited to the following types: a Global System for Mobile Communications/General Packet Radio Service (GSM/GPRS) link; a UMTS (Universal Mobile Telecommunications System) link; a Code Division Multiple Access (CDMA) link; an Evolution-Data Optimized (EV-DO) link; an Enhanced Data Rates for GSM Evolution (EDGE) link; a 3GSM link; a Digital Enhanced Cordless Telecommunications (DECT) link; a Digital AMPS (IS-136/TDMA) link; an Integrated Digital Enhanced Link (iDEN) link; a WiMAX link; or any other suitable wireless link.

Each mobile router 112 and its corresponding mobile device 116 are co-located in a vehicle 101 so that mobile router 112 is capable of being mobile and operable to establish connectivity whether mobile or stationary such that each end-user of a mobile device 116 can enjoy wireless connectivity to Internet 118 via mobile router 112 as the vehicle travels through cells or nodes associated with wireless network 122. Vehicle 101 may be any type of vehicle that travels over and/or under land, over and/or under water, or in the air or space. The typical most common type of vehicle 101 that is likely to include a mobile router is a car, truck, or bus.

Each mobile router 112 may be mounted in a corresponding vehicle 101 in a secure and generally tamper-resistant location. For example, the mobile router 112 may be mounted in the trunk of an automobile, and the end-user of the mobile device 116 may be a passenger or driver of the automobile. That way, the end-user could enjoy wireless connectivity as the automobile moves between cells of the wireless network 122.

Although only one mobile device 116 is shown in communication with each mobile router 112 shown in FIG. 1, numerous mobile devices 116 may be in communication with a corresponding mobile router 112 via the corresponding local area network 115.

Cellular network cell site transceiver 130 may be used to provide a cellular link to mobile router 112 and both receive and transmit wireless signals to a mobile router 112 via one of the wireless cellular communication links 122. A cellular communication network 132 of cellular backhaul network 120 may communicate via the worldwide web or Internet 118 or another network via one or more gateways 124. Each communication network 132 may include conventional communication network elements to provide wireless cellular network service for each mobile router 112.

Figure 2:
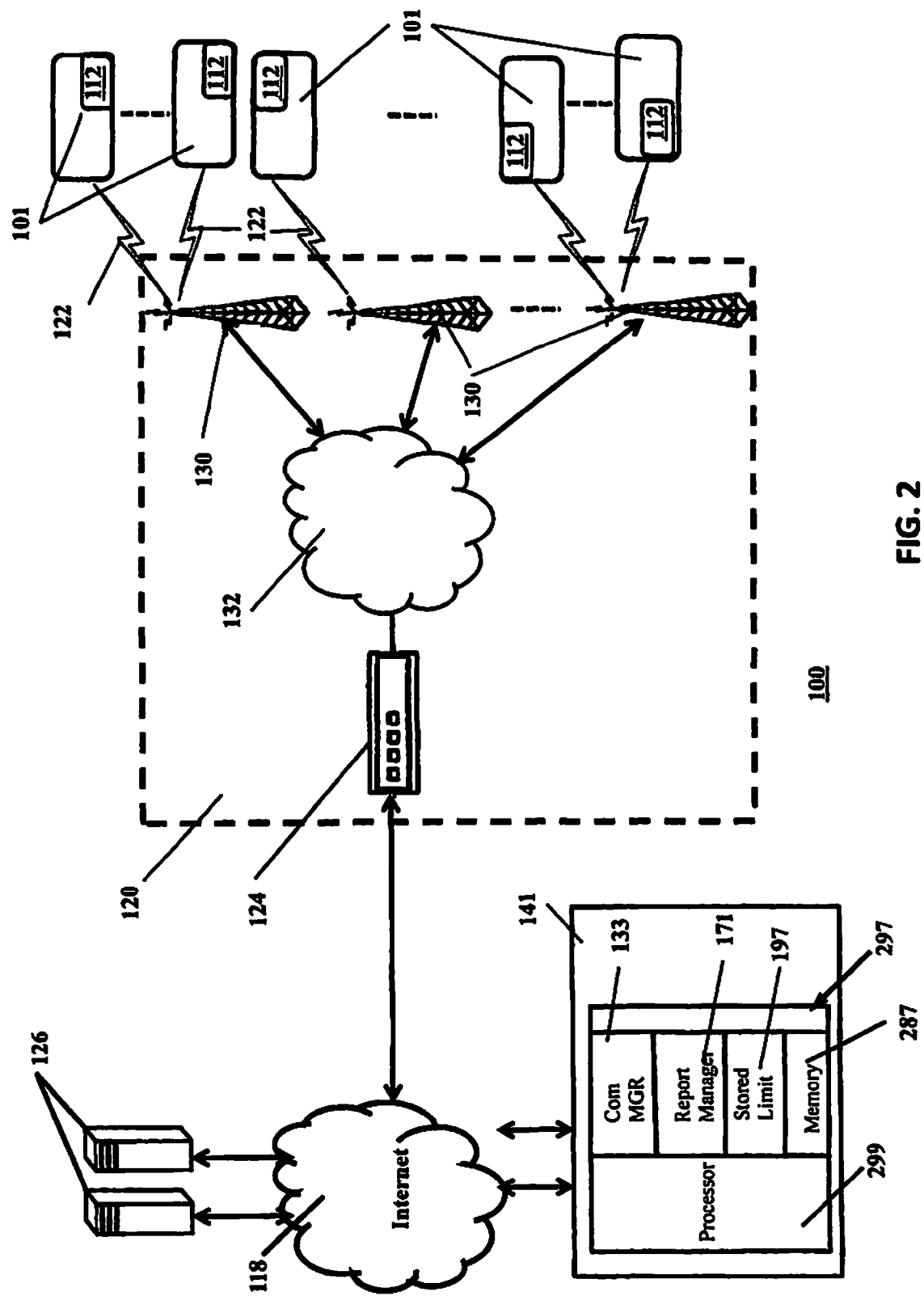
FIG. 2 is a block diagram of an expanded mobile router network arrangement.

Turning now to FIG. 2, mobile router network 100 is shown in a more expanded networked arrangement in which cellular backhaul network 120 is shown as having a plurality of cell site transceivers 130, each of which can communicate with one or more vehicles 101 having a mobile router 112 therein. FIG. 2 shows one gateway 124 to Internet 118, but it will be appreciated that there may be a plurality of such gateways 124, each of which may have access to the Internet 118 or to another network.

Figure 3:
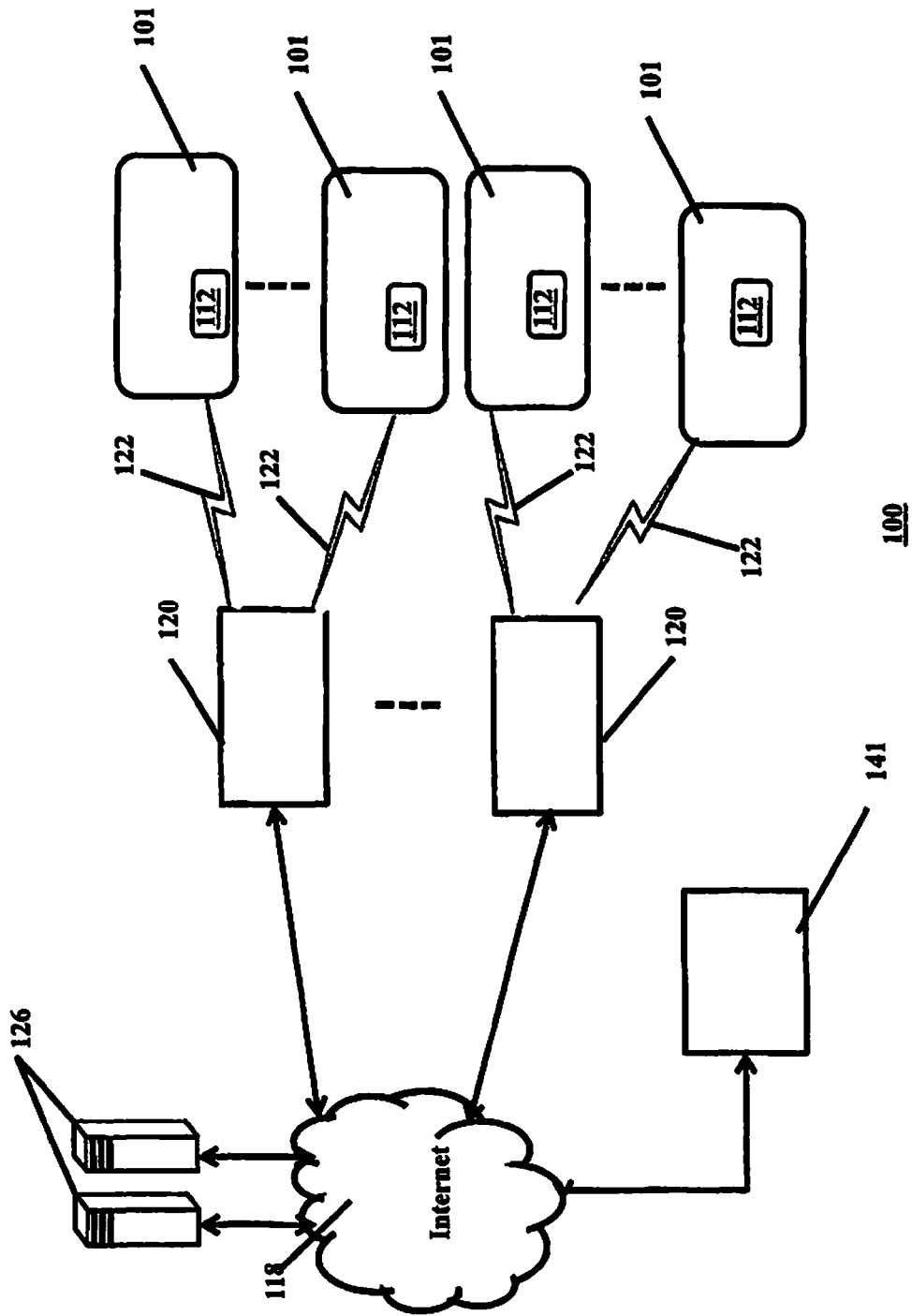
FIG. 3 is a block diagram of a further expanded mobile router network arrangement.

Turning now to FIG. 3, mobile router network 100 is illustrated in further expanded form to show that in which there may be a plurality of cellular backhaul networks 120 each comprising a number of cell site transceivers, each located in different areas serviced by the backhaul networks 120, such that each mobile router 112 may stay in communication with a backhaul network 120 as each mobile router 112 moves between cells or nodes of the backhaul networks 120. It will be appreciated by those skilled in the art, that there is virtually no limit to the size of mobile router network 100.

Each of FIGS. 1 through 3 shows that mobile router network 110 comprises at least one network operations center 141. Network operations center 141 comprises a database 143 and a network management system 145. Network management system 145 is a combination of hardware and software used to monitor and administer or otherwise manage mobile router network 100. Each mobile router 112 is managed as an individual network element.

Network management system 145, comprises an authentication server 129, a session manager 131, and a communication server 133. Communication server 133 is a combination of hardware and software used to manage communications between mobile routers 120, and network management system 145.

Figure 4:
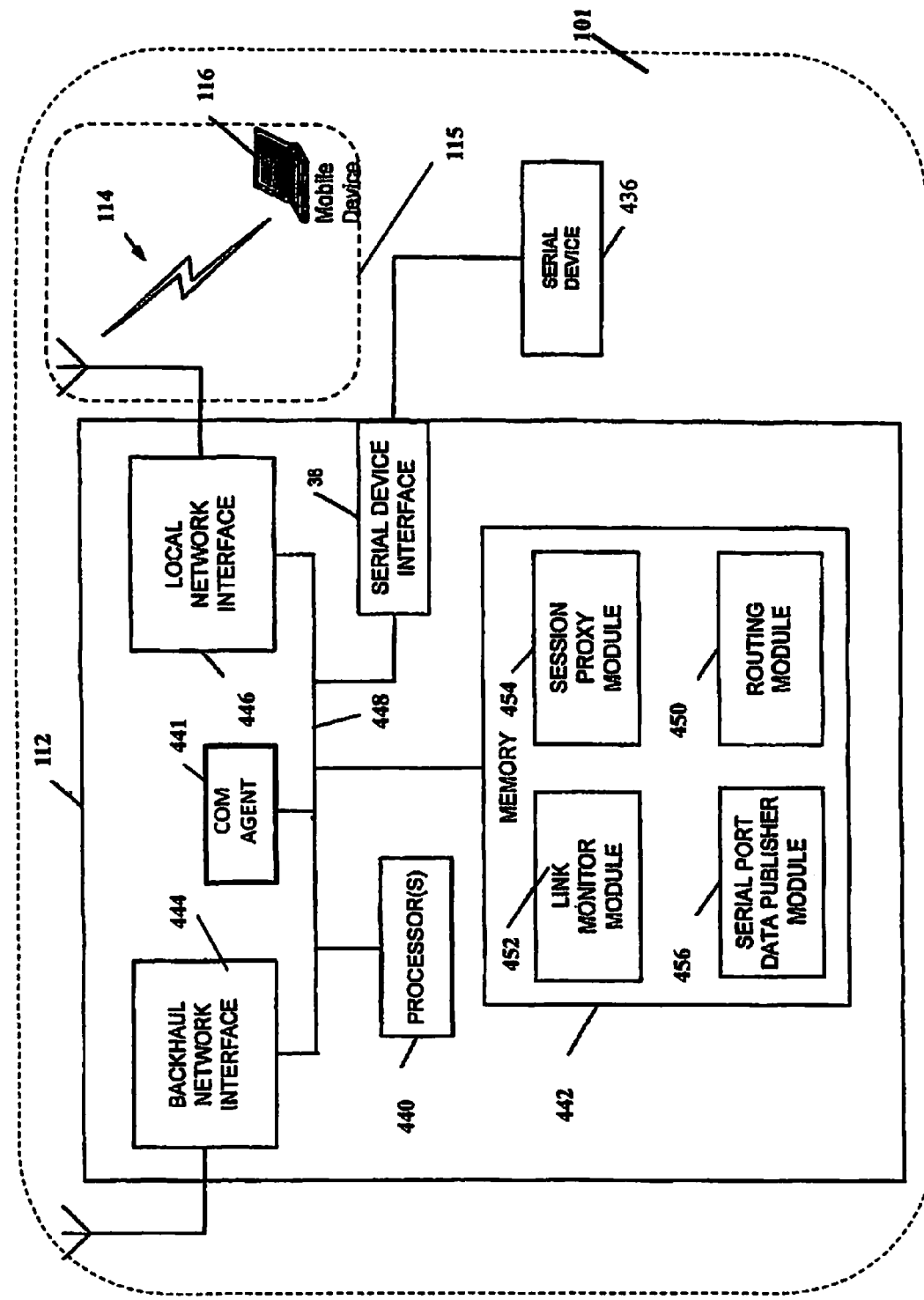
FIG. 4 is a block diagram of a mobile router.

FIG. 4 is a simplified block diagram of a mobile router 112 situated in a vehicle 101. Mobile router 112 comprises processor 440, one or more memory units 442, a backhaul network interface or wide area network interface or cellular network interface 444, and a local network interface 446. A system bus 448 interconnects processor 440, memory units 442, backhaul network interface 444 and local network interface 446.

Backhaul or cellular network interface 444 interfaces with and provides a wireless communication link with backhaul or cellular network 120 via cell site transceiver 130. Backhaul or cellular network interface 444 may interface with one or more types of wireless cellular communication links 122. For example, the backhaul cellular network interface 444 may interface to any one or more of: a Global System for Mobile Communications/General Packet Radio Service (GSM/GPRS) link; a UMTS (Universal Mobile Telecommunications System) link; a Code Division Multiple Access (CDMA) link; an Evolution-Data Optimized (EV-DO) link; an Enhanced Data Rates for GSM Evolution (EDGE) link; a 3GSM link; a Digital Enhanced Cordless Telecommunications (DECT) link; a Digital AMPS (IS-136/TDMA) link; an Integrated Digital Enhanced Link (iDEN) link; a WiMAX link; or any other suitable wireless link.

Local network interface 446 interfaces and provides a wireless communication link 114 with wireless local area network 115. Similarly, local network interface 446 may interface to one or more types of wireless network links 114 such as a Wi-Fi, WiMAX, or Bluetooth link.

Processor 440 may execute various programs or instruction code stored in memory 442. Memory 442 may comprise one or more types of computer-readable media. As such, memory 442 may comprise one or more memory chips, optical memory devices, magnetic memory devices, or other memory devices.

Various programs or program modules are executable by processor 440. The program modules include a routing module 450, a link monitor module 452, a session proxy module 454, and a serial port data publisher module 456. The program modules 450, 452, 454, 456 may be stored in portions of memory 442 or in one or move separate memories.

Routing module 450 is executed by processor 440 to route data packets between wireless network 415 and backhaul or cellular network 420. Link monitor program 452 monitors cellular communication links 122 (layer 2) and also Internet communication links (layer 3) via backhaul or cellular network 120 by sending test or probing data packets and monitoring for responses thereto. By monitoring the sending and receiving of test packets and responses, processor 440 executing link monitor program 452 detects if either (or both) of cellular communication link or Internet 118 link fails.

When processor 440, executing link monitor module 52, detects a drop-off, the dropped link is automatically reestablished to minimize the interruption in service to the end user.

In many prior art mobile routers, when communications links are lost, the end-user's applications and network sessions are terminated. The end-user has to restart the applications and/or session when the communications links and network connection are reestablished.

When processor 440 detects a failure in one or both of the communications link 122 or Internet 118 link, processor 440 initiates remedial action by attempting to reestablish the link or links. Processor 440 may reestablish the link before any applications on the corresponding mobile device 116 have to be restarted. That way, the user does not have to restart the applications or sessions. The user just typically notices that the applications/sessions slowed for a brief period of time while the connection was being reestablished.

Link monitor module 452 as executed on processor 440 provides adaptive programming. If backhaul or cellular network interface 44 receives data packets over backhaul wireless communication link 122, processor 440 sends fewer probing test data packets. Conversely, if backhaul or cellular network interface 444 does not receive data packets, processor 440 sends more probing test data packets. By monitoring data packets received via backhaul or cellular network interface 444, processor 440 determines that the interface is functioning. Accordingly, processor 440 sends data test packets less frequently.

Processor 440, executing link monitor module 452, monitors backhaul network interface 444 to determine that data packets are received. If processor 440 determines that backhaul wireless communication link 122 is working, then processor 440 sends fewer active probes on the backhaul or cellular network 120.

Processor 440, by executing session proxy module 454 acts as a session proxy for all TCP sessions going through mobile router 112. When a mobile device 116 seeks to establish a TCP session with a destination such as a third party server 126 coupled to Internet 118, 440 terminates the TCP session coming from mobile device 116 and, instead, establishes a TCP session via backhaul network interface 444 with the destination. Mobile router 112 also maintains a separate TCP session with mobile device 116 via local wireless communication link 114.

All end-user traffic between mobile device 116 and the destination is transparently routed through mobile router 112 during the two separate sessions. If one session such as the backhaul wireless communication link 122 goes down that does not negatively affect the session between the mobile router 112 and mobile device 116. As a result, processor 440, executing session proxy program module 454, maintains a TCP session to mobile device 116. If applications running on mobile device 116 are dependent upon a TCP session, the applications may continue to run because there is a TCP session with the mobile router 112, even though the TCP session over the backhaul or cellular wireless communication link 122 is lost. When communications via backhaul or cellular communication link 122 are reestablished, mobile device 116 is able to keep running its applications and session without having to restart the applications.

When communication over backhaul network or cellular communication link 122 is interrupted, processor 440, executing session proxy program module 454, prevents the TCP session for wireless communication link 114 to mobile device 116 from starting its back-off timers. Under TCP protocol, mobile device 116 would normally assume that it cannot forward packets because of network congestion and it would accordingly start to slow down the session. In contrast, processor 440, executing session proxy module 454, maintains a TCP session between mobile router 112 and mobile device 116. Mobile 116 device does not assume that network congestion is a problem and the TCP session between mobile router 112 and mobile device 116 does not slow down.

Execution of session proxy module 454 by processor 440 may be disabled by mobile device via a control panel for mobile router 112 displayed on mobile device 116. A user can disable execution of session proxy program module 454 when the user wants to maintain a TCP session with the destination.

Processor 440 when executing serial port data publisher module 456 makes data received from a serial device 436 connected to a serial port 438 available via mobile router 112 as a TCP stream or as some other type of data stream, such as HS-TCP or SCPS data stream. A remote database 125, as shown in FIG. 1 may be populated with the data from device 436 via backhaul or cellular network 120 and Internet 118 so that data from serial device 436 can be remotely accessed via the Internet 118.

Serial device 436 may communicate with mobile router 112 using any suitable serial data protocol, including the USB (Universal Serial Bus) standard, the RS-232 standard, the RS-485 standard, or the IEEE 1394 (FireWire) standard, for example.

Serial device 436 may be any suitable type of serial device, such as, for example, a GPS receiver. Other types of serial data devices 436 may be used. Serial device 436 may be a vehicle telematics device that captures data regarding the performance and operation of the vehicle (e.g., diagnostic data) in which the device is installed. Serial device 436 may be a point-of-sale (POS) device that captures sale or payment information.

Serial data device 436 may also be a remote control for an in-car entertainment system that enables downloading music, video, games, etc., to third party systems or a device for interfacing to communication systems.

Rather than transmitting the data to a central server, e.g., database 125 shown in FIG. 1, a remote user could access mobile router 112 to access the data from serial device 436 directly. In one embodiment, an authenticated remote user could access an authentication server 123 as shown in FIG. 1 to determine the address of a specific one mobile router 112. The remote user could then use that address to communicate with mobile router 112 directly. Similarly, a local end-user of the mobile router 112 could access the data from the serial device via the local wireless network 114.

Processor 440 can output data and command signals via serial interface 438 to serial device 436. Utilizing serial interface 438, processor 440 may activate and control various components and/or systems of a vehicle 101. Serial device 436 may be able to shut of the vehicle engine, unlock the doors, activate alarm functions, etc. Serial device 436 may also, according to various embodiments, perform payment functions, download data, receive advertising, entertainment, gaming, and/or information, as well as perform network management and control.

Each mobile router 112 includes a communication agent 441. Communication agent 441, in the embodiment shown, is a program executed by processor 440, but in other embodiments, communication agent 441 may be a separate processor and program. Communication agent 441 cooperatively operates with communication server 133 shown in FIG. 1.

Processor 440 of each mobile router 112 has the ability to run applications that can perform functions and collect data independently of whether or not mobile router 112 is linked to network management system 120.

Each mobile router has associated with it a specific identifier that is maintained in database 145. The specific identifier can be any unique identifier such as a router serial number or a vehicle identification number. Network operations center 141, utilizing communication server 133, is capable of selectively communicating with each mobile router 112.

Advantageously, the selective communication between each mobile router 112 and network operation center 141 permits the downloading of application programs 565 to each of mobile routers 112 for storage in memory 442 on a selective basis, the communication of data obtained from each router 112 as a consequence of execution of a downloaded application program, and/or the communication of statistical information obtained in or by a mobile router as a result of execution of an application program.

In addition, network operation center 141 is operable to facilitate the downloading of application programs ordered by each mobile router 112 directly or indirectly from third party servers 126.

Network operations center 145 also sends predetermined commands to specific predetermined specific mobile routers 112 for immediate execution or for execution at a predetermined specified interval.

Figure 5:
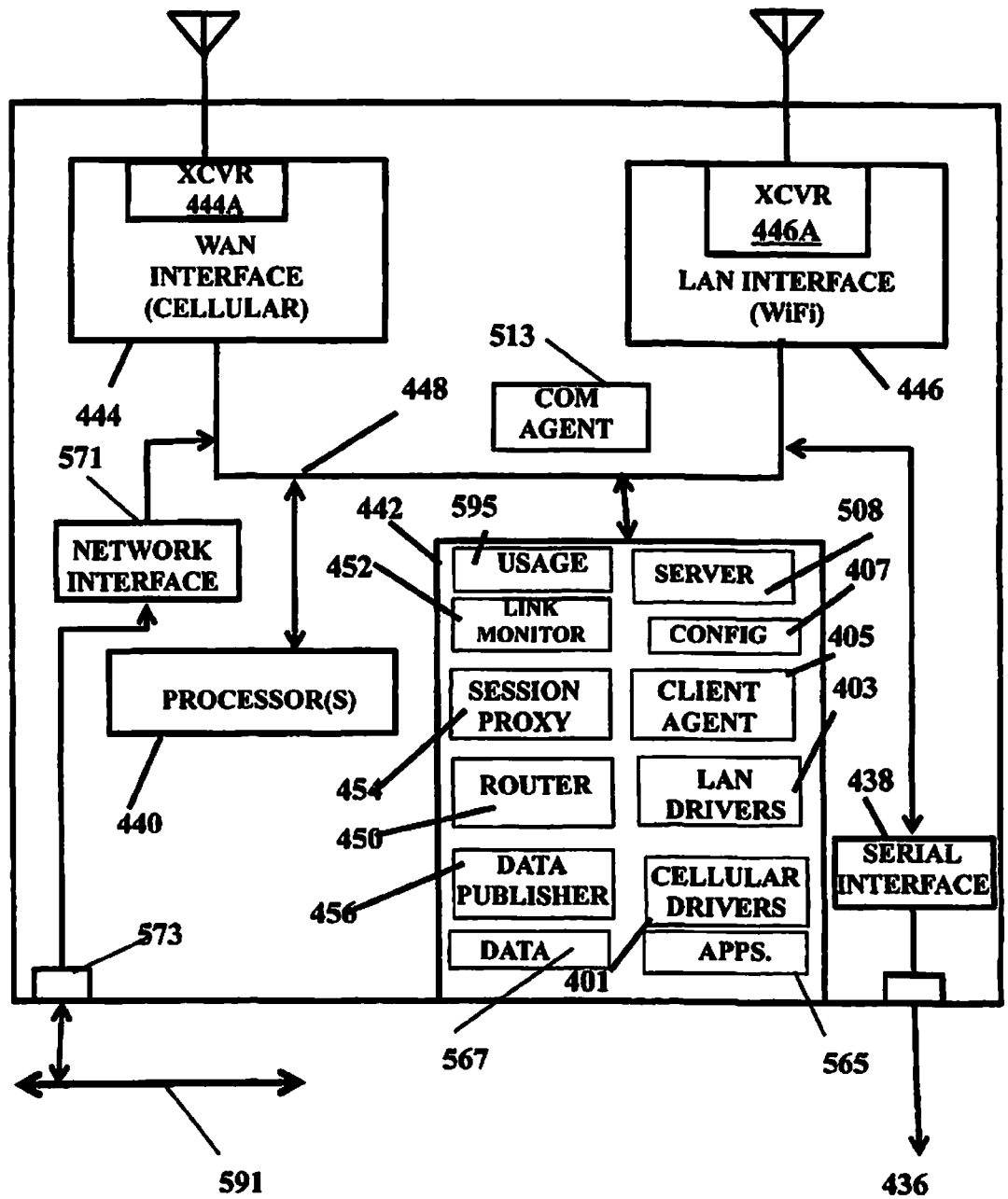
FIG. 5 is a more detailed block diagram of the mobile router of FIG. 4.

As shown in FIG. 5 each mobile router 112 stores application programs in memory 565. Each mobile router 112 is operable to collect data utilizing application programs 565 as well as from interfaces to the vehicle in which mobile router 12 is installed and/or from peripherals 430 coupled to mobile router 112 via serial data interface 438 and/or from mobile device 16. The collected data is marked with a timestamp and stored in memory 442 of mobile router 112. Depending on the nature of the data, mobile router 112 may process the data and prepare the resulting processed data for upload or mobile router 112 may prepare the data immediately for upload to network management system 120. In accordance with one embodiment, the data may be provided by a telematics device or devices.

In certain embodiments, each vehicle 101 includes a vehicle network bus 591 that typically utilizes a standardized protocol over which data or commands may be communicated with various sensors, nodes, processors and other vehicular apparatus coupled to the vehicle network bus.

Vehicle network bus 591 is a specialized internal communications network that interconnects components inside a vehicle (e.g. automobile, bus, train, industrial or agricultural vehicle, ship, or aircraft). Special requirements for vehicle control such as assurance of message delivery, assured non-conflicting messages, assured time of delivery as well as low cost, EMF noise resilience, redundant routing and other characteristics are met with the use of various standardized networking protocols.

Standardized vehicle network bus protocols include Controller Area Network (CAN), Local Interconnect Network (LIN) and others.

Vehicle network bus 591 provides access to the various vehicle electronic control modules in the vehicle. Some of the typical electronic modules on today's vehicles are the Engine Control Unit (ECU), the Transmission Control Unit (TCU), the Anti-lock Braking System (ABS) and body control modules (BCM).

A vehicle electronic control module typically gets its input from sensors (speed, temperature, pressure, etc.) that it uses in its computation. Various actuators are used to enforce the actions determined by the module (turn the cooling fan on, change gear, etc.). The electronic control modules need to exchange data among themselves during the normal operation of the vehicle. For example, the engine needs to tell the transmission what the engine speed is, and the transmission needs to tell other modules when a gear shift occurs. This need to exchange data quickly and reliably led to the development of vehicle network bus 591. Vehicle network bus 591 is the medium of data exchange.

Vehicle network bus 591 is utilized to create a central network in the vehicle 101. Each electronic control modules is 'plugged' into the network and can communicate with any other electronic control module installed on the network via vehicle network bus 591. Each electronic control module controls specific components related to its function and communicates with the other modules as necessary, using a standard protocol, over the vehicle network bus 591.

In addition, vehicle network bus 591 may utilize any one of a number of physical transmission media, including, but not limited to: single wire, twisted pair, and fiber optic.

Each mobile router 112 includes a vehicle network bus interface 571 and a connector 573 that connects to the vehicle network bus 591 of vehicle 101.

In one embodiment, a vehicle 101 comprises a vehicle network bus 591 and a mobile router 112. Mobile router 112 comprises a local area network interface 446 comprising a first wireless transceiver 446A of a first predetermined type to provide a link 114 to first a local area network 114 and a wide area network interface 444 comprising a second wireless transceiver 444A of a second predetermined type to provide a link 122 to a wide area network 122. The embodiment further comprises processor 440 to control operation of the local area network interface 446 and the wide area network interface 444. One of the wide area network interface 444 and the local area network interface 446 is selectively operable to establish a wireless communication link with network management system 141 comprising a communication server 133. Each mobile router 112 further comprises a communication agent 513, and an application 565 executable by the 440 to selectively acquire predetermined data from the vehicle network bus 591. Communication agent 513 is operable to upload the predetermined data obtained from vehicle network bus 591 to network management system 141 of FIGS. 1, 2, 3.

Processor 440 is operable to acquire the predetermined data during time periods that wide area network interface 444 is not communicating with network management system 141. Communication agent 513 is operable to upload the predetermined data to network management system 141 upon occurrence of a predetermined event.

The predetermined event may comprise a predetermined time period that may be the time wide area network interface 444 is in communication with network management system 141 and/or the predetermined event is determined by the predetermined data, such as, for example, data that indicates deployment of an air bag.

Mobile router 112 stores the predetermined data in memory 567.

Processor 440 provides a time stamp for the predetermined data at the time the predetermined acquired data is acquired. The time stamp is stored in memory 567 in association with the corresponding predetermined data.

Processor 440 is operable to assign a priority for the predetermined data; and is operable to execute a predetermined action to take with the predetermined data.

Processor 440 is operable to initiate immediate upload of the predetermined data to network management system 141 of the predetermined data having a predetermined one assigned priority. By way of non-limiting example, data indicating deployment of air bags would be assigned a priority for immediate upload.

Processor 440 is operable to control upload of predetermined data having a first predetermined one assigned priority at a first data rate. Processor 440 is operable to control upload of second predetermined data having a predetermined second assigned priority at a second predetermined data rate, the second predetermined data rate being slower than the first predetermined data rate.

Communication agent 513 is operable to determine if uploading of the predetermined data is interrupted. Communication agent 513 is operable in cooperation with the communication server 133 to restore uploading of the predetermined data to network management system 141 from the point of interruption when a communication link between the network management system 141 communication server 133 and the communication agent 513 is restored.

Processor 440 is operable to process the predetermined data prior to the data being uploaded; and processor 440 is operable to store the processed predetermined data as the predetermined data in memory 567.

A time stamp is generated for the predetermined data when it is acquired. The time stamp is stored in memory 567 in association with the corresponding processed predetermined data.

Communication agent 513 may be further operable to determine when uploading occurs in cooperation with the application program or programs 565.

The predetermined data may comprise statistical data and/or diagnostic data. The diagnostic data is obtained via the vehicle network bus interface 571. Processor 440 is operable to process the diagnostic data to generate message data. Communication agent 513 is operable to upload the message data to network management system 141 via one of the local area network interface 446 and the wide area network interface 444.

In various embodiments, the application or applications 565 is or are downloaded to the vehicle via one of the wide area network interface 444 and the local area network interface 446.

It will be appreciated by those skilled in the art that the various functions of each of the plurality of mobile routers 112 may be integrated directly into a vehicle 101. In such an application of the principles of the invention, a vehicle 101 may comprise a vehicle network bus 591; a local area network interface 546 comprising a first wireless transceiver 546A of a first predetermined type to provide a link 114 to first a local area network 115; a wide area network interface 444 comprising a second wireless transceiver 444A of a second predetermined type to provide a link 122 to a wide area network 120; processor 140 to control operation of the local area network interface 446 and the wide area network interface 444. At least one of the wide area network interface 446 and the local area network interface 444 is selectively operable to establish a wireless communication link with a network management system 141 comprising a communication server 133. Vehicle 101 further comprises a communication agent 441 and one or more applications 565 executable by processor 140 to selectively acquire predetermined data from the vehicle network bus 591. Communication agent 513 is operable to upload the predetermined data to network management system 141.

Data for uploading can be prioritized and rate limited by processor 140. By way of non-limiting example, if the data has a high priority, such as an indication of airbag deployment then the data is immediately prioritized over anything else and is uploaded. If the data has a low priority it can be sent at a low bit rate so as not to interfere with the experience of the user of mobile device 16 or anything the user might be doing. For example, low priority data may be "trickled up" or uploaded at 10 Kbps.

If the uploading of data from a mobile router 112 or vehicle 101 is interrupted for any reason the session, such as, for example, by loss of communications via a wireless wide area network communication link 122, mobile router 112 or processor 440 will restore the uploading of data where the uploading had left off, when a communication link is again established to communication server 133.

In various embodiments, the number of mobile routers 112 may be very large, and may number millions of mobile routers 112 or other mobile devices. To efficiently provide an arrangement for tracking/monitoring the number of routers, a distributed network arrangement and method is provided for providing communication to the routers. More specifically, to support the ability of the system to scale up back-end systems that support mobile devices in vehicles that number from a few thousand to millions, we developed a method and architecture that allows for easy addition of capacity as the networked number of mobile routers increases.

Every mobile router 112 is configured to communicate with a communication server for uploading of data and for downloading content.

Figure 6:
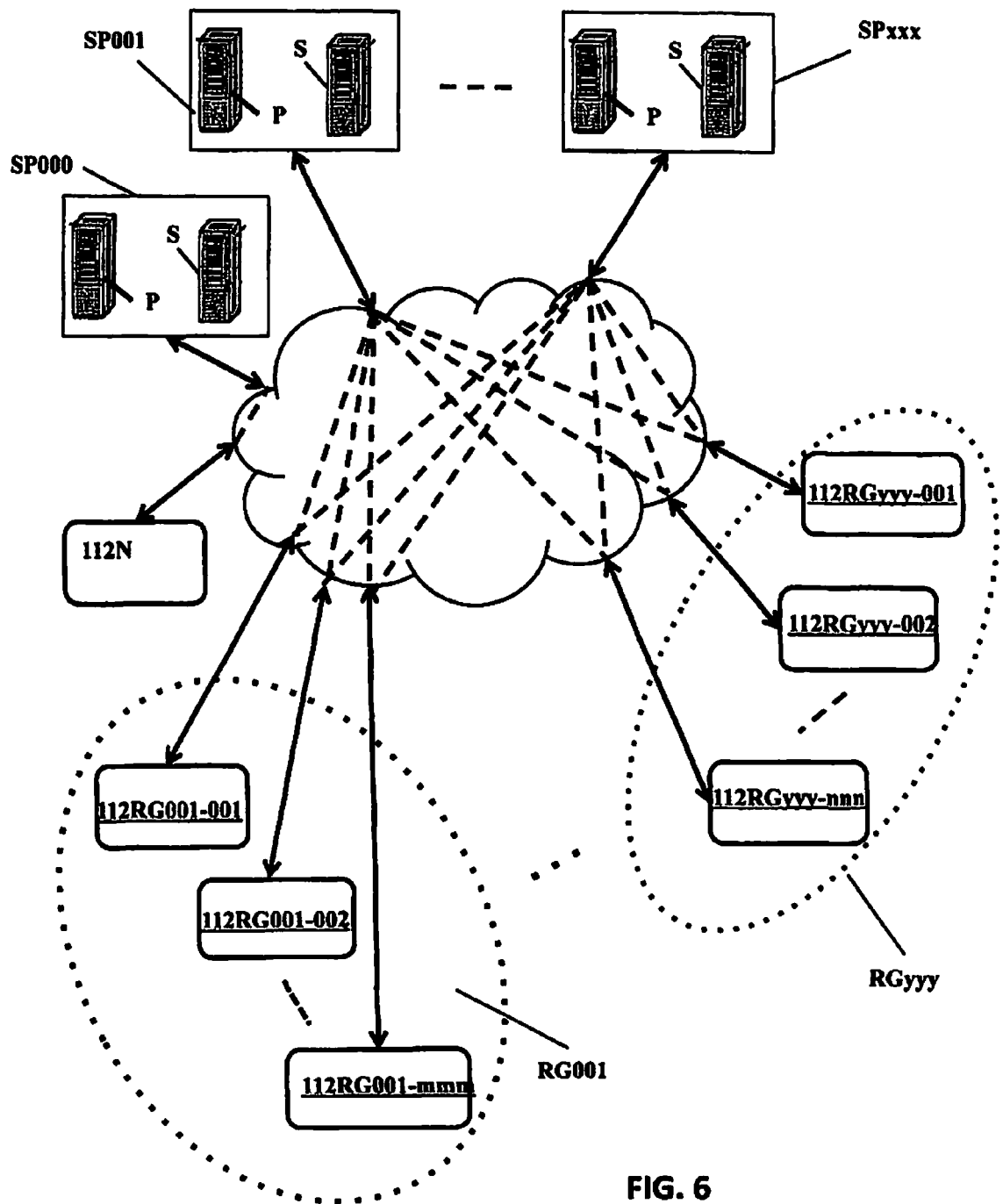
FIG. 6 illustrates details of an expandable router network.

Mobile router 112 comprises an interface 444 to a wireless communications link; a memory 442 storing information comprising configuration information 407; a memory 508 storing main server information utilizable to identify a main network server; and a communications agent 513 operable with the interface 444 to establish communication via the wireless communications link 122 to a network 600 shown in FIG. 6 comprising a main server SP000 and a plurality of group servers SP001 . . . SPxxx. Network 600 is an expanded version of network 100 shown in FIGS. 1, 2, and 3. Communications agent 513 is operable such that its initial communication to network 600 utilizes the main server information stored in memory 508 to establish a first communication with main server SP000. Mobile router 112 further comprises processor or microprocessor 440 operable with communications agent 513 to interact with main server SP000 to upload the configuration information from memory 407 to main server SP000 via network 600 shown in FIG. 6.

Communications agent 513 is operable to receive group server identification information from main server SP000 when communicating with main server SP000 a second time. Microprocessor 440 is operable to store the group server identification information in memory 508. The group server information comprises information identifying one or more servers corresponding with a predetermined group assigned by main server SP000. Communications agent 513 utilizes the group server identification information for subsequent communication via network 600.

The group server identification information is received by communications agent 513 from main server SP000 the second time mobile router 112 establishes communication with main server SP000. Communications agent 513 utilizes the group server identification information to access one group server of the plurality of group servers SP001, SPxxx.

The group server identification information comprises identification information for a predetermined number of group servers selectively assigned from the plurality of group servers SP001, SPxxx.

Turning back to FIG. 5, microprocessor 440 is operable to select a group server from the predetermined number of group servers with which to communicate via network 600. Microprocessor 440 selects the group server from the predetermined number of group servers in accordance with a predetermined selection algorithm. In one embodiment, the group server is selected by accessing the first available group server by attempting to access the group servers in sequential order as stored in memory 508.

Although the above description refers to each server in the singular, in an embodiment of the invention, each group server SP001, . . . , SPXXX shown in FIG. 6 comprises a corresponding pair of servers P, S that are identically configured.

One group server P, S of each group server pair operates as a primary server P to track and monitor the plurality of mobile routers and the corresponding paired server is selected as a backup secondary server S. Each primary group server P and its corresponding secondary server S operate such that data in primary group server P is replicated into its corresponding secondary server S.

Primary group server P and the secondary server S operate to determine if a failure occurs in the primary group server; and the primary group server P and the secondary server S operate to automatically switch to the secondary server as primary group server upon occurrence of a failure. After the original primary group server P is repaired, it is manually switched back in service.

The group server pairs SP001, . . . , SPxxx are dispersed to be located at dispersed geographic locations and have different network peering points.

When a new mobile router 112N is provisioned at the factory, it is configured to talk to the "main" communications server pair SP000 at the network operations center 141 shown in FIG. 1 by storing access information for "main" communications server pair SP000 in memory 508. Each newly provisioned mobile router 112N registers with the "main" communications server pair SP000 and uploads its configuration information to "main" communications server pair SP000. When mobile router 112N registers with the "main" communications server pair SP000 it calls into an "unassigned" server group address by default.

When mobile router 112N is sold and shipped it is assigned to a group selected from a plurality of groups RG001-RGyyy. The group to which a mobile router 112 is assigned is usually customer specific. Non-limiting examples of such customers to which a mobile router is assigned include automotive companies, e.g., Chrysler, or electronics retailers, e.g., Best Buy.

The next time mobile router 112N comes on line and talks to main communications server pair SP000, main communications server pair SP000 will identify that mobile router 112N has been assigned to a group selected from the groups RG001 through RGyyy that is different from the "unassigned" group. Main communications server pair SP000 will then reassign mobile router 112N to talk to a new communications server pair that handles the group to which mobile router 112N has been assigned by downloading the new communication server pair access information to memory 508. The new communications server pair is selected from the communications server pairs SP001 through SPxxx There can be multiple communications server pairs per group and each communications server can support multiple groups.

Each mobile router 112 is configured by the main communications server pair SP000 with addresses for multiple communications server pairs. The addresses for the multiple communication server pairs are stored in mobile router 112 memory 508 shown in FIG. 5. Memory 508 may be an assigned portion of memory 442 as shown or may be a separate memory. Each mobile router 112 will access the server addresses stored in its corresponding memory 508 in a predetermined order. If a communication server pair associated with a first address is unavailable, mobile router 112 will access the next address of a communications server stored in memory 508. Mobile router 112 will access communications server addresses from memory 508 in predetermined order until communications with a corresponding communications server is established.

Figure 7:
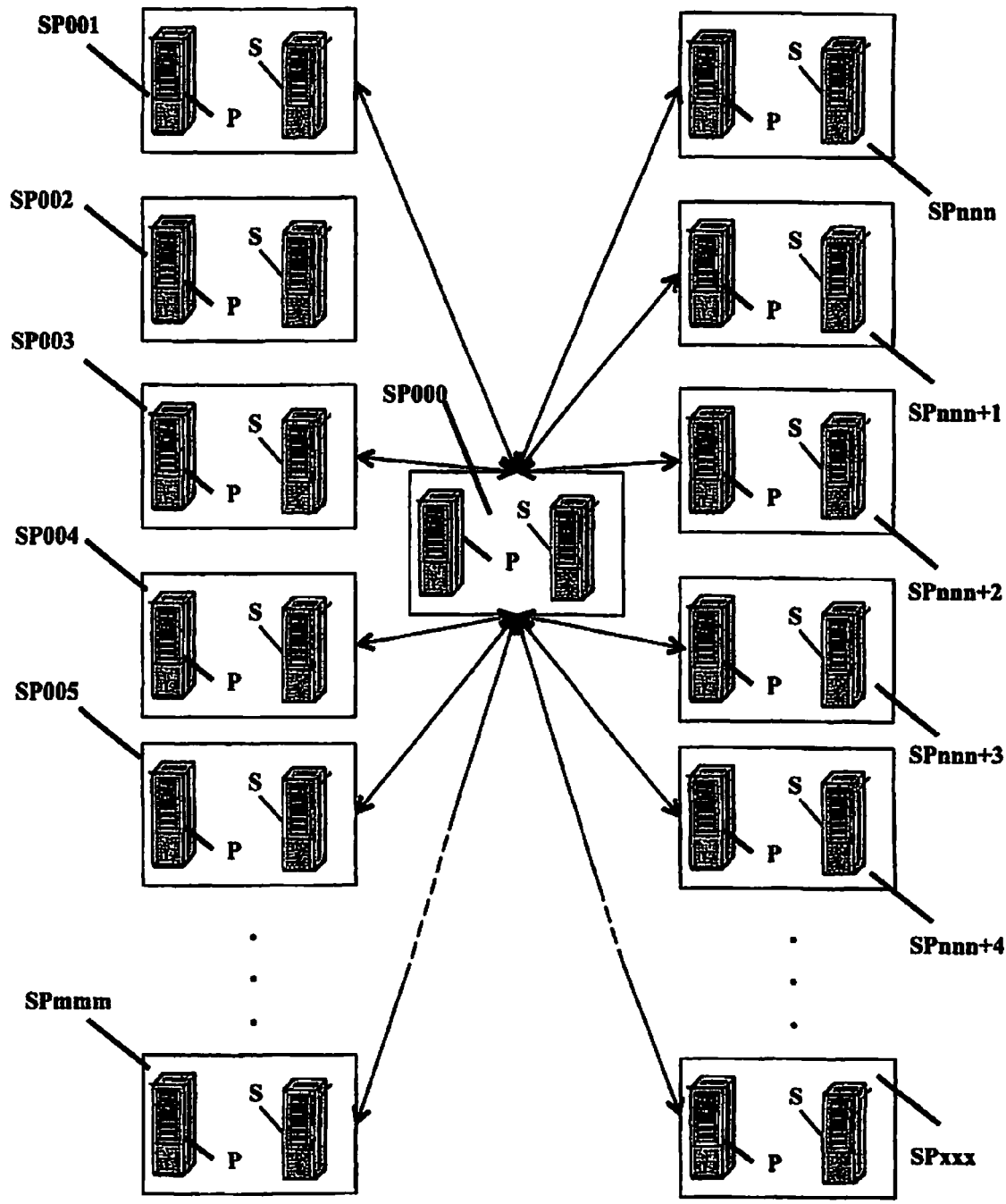
FIG. 7 illustrates further details of the network of FIG. 6.

Main server pair SP000 includes a manager program. The manager program is provided so that main server pair SP000 may communicate to all of communications servers SP001-SPXXX, so an operator of the network system never needs to know which communications server communicates with which router. The communication by main server pair SP000 to server pairs SP001-SPXXX is illustrated in FIG. 7.

Communications server pairs SP001-SPXXX do not need to be located in the same facility. It is preferable that the communications server pairs SP001-SPXXX are not in the same facility. It is highly preferable that the communications server pairs SP001-SPxxx are geographically disperse and have different network peering points.

With the server network architecture described above, added capacity is easily added by simply adding additional server pairs and configuring them as available within the system manager at the network operations center SP000.

As pointed out above, cellular carriers or service providers typically charge for data usage by a customer on the basis of the amount of data bytes uploaded and downloaded to the customer device. Frequently there may be discrepancies between the carrier's or service provider's reported data usage and the actual data usage. Generally the discrepancies are in the carrier's favor.

Cellular carriers or service providers typically require that discrepancies be reported within a predetermined fixed time period, e.g., 30 days, of the bill.

Turning back to FIG. 5, mobile router 112 utilizes processor 440 to collect cellular network usage or statistical data by counting data bytes received and transmitted via WAN interface 444.

Mobile router 112 determines whether or not WAN interface 444 is coupled to cellular network 120. If router 112 is coupled to cellular network 120, mobile router 120 monitors the data bytes transferred over cellular network 120 between mobile device 116 and a destination device. Mobile router 112 collects data transfer data.

Subsequent to collection of data transfer data, mobile router 112 determines whether there is an active connection to cellular network 120. If there is no connection to cellular network 120, processor 440 stores the usage or statistical data in memory 595 as shown in FIG. 5. Processor 440 records the numbers of bytes sent separately from the number of bytes received.

Turning now to FIG. 9 in conjunction with FIG. 1, the operation at network operations center 141 is described. The uploaded statistical or usage data from each mobile router 112 is received at step 901. The uploaded usage or statistical data is stored in database 143 at step 903.

Network operations center 141 shown in detail in FIG. 1 is operable with a network 100 comprising a plurality of wireless mobile routers 112. Each mobile router 112 shown in FIGS. 4 and 5 comprises a wide area network wireless interface 144, 444 to access a cellular network 120 provided by a predetermined cellular service provider. Each mobile router 112 is operable to upload data and to download data via cellular network 120. Each mobile router 112 is operable to monitor the uploaded data and the downloaded data. Network operations center 141 comprises: first apparatus 133 operable to manage communications with the plurality of mobile routers 112, operable to receive data, and operable to access billing data from the predetermined cellular service provider for each of the mobile router 112.

Network server 297 shown in FIG. 2 is operable with a plurality of wireless mobile routers 112. Each mobile router 112 comprises a wide area network wireless interface 444 to access a cellular network 120 provided by a carrier as shown in FIG. 4. Turning back to FIG. 2 each mobile router 112 is operable to upload data and to download data via cellular network 120. Each mobile router 120 is operable to monitor the uploaded data and the downloaded data and to or usage data.

Each mobile router 112 receives data services from a service provider that provides the network operations center 141. The data services are coupled to each mobile router 112 via cellular network 120 provided by a cellular network carrier.

As pointed out hereinabove, it is sometimes useful to be able to limit the amount of data throughput with a mobile router 112. Some reasons for doing this may be that a mobile device user 116 has reached the limit of the data subscription from the service provider, or network 100 is overloaded and it is necessary to ensure that the available bandwidth is more equally distributed. In the first instance, rather than charging the user, or in both instances shutting down data flow to the user, the each mobile router 112 is operable to control the data rate of its data throughput.

Each mobile router 112 and mobile router network 100 provide for dynamically throttling available bandwidth to a user of a mobile router based upon configurable thresholds.

Network operations center 141 includes a network server 297 that can configure data rate limiting rules for each mobile router 112. Network server 297 downloads a rate limiting rule set to each mobile router 112.

By way of non-limiting example, an exemplary rule set downloadable to a mobile router 112 is: 5000/500:5500/400: 6000/250:7000/100.

Mobile router 112 utilizes the rule set such that a predetermined period, such as a monthly billing period, when mobile router 112 has downloaded 5000 megabytes of data, mobile router 112 controls its data rate to be limited to 500 Kbps. When mobile router 112 has downloaded 5500 megabytes of data, during the predetermined period mobile, router 112 controls its data rate for subsequent download data to be limited to 400 Kbps. When mobile router 112 has downloaded 6000 megabytes of data during the predetermined period mobile router 112 controls its data rate for subsequent downloaded data to be limited to 250 kbps. When the user has downloaded 7000 megabytes, limit the users download speed for subsequent downloaded data to be limited to 100 kbps It should be apparent to one skilled in the art that the foregoing is merely one representative exemplar of a rule set. Different rule sets may be used.

The data rate limiting occurs in mobile router 112. By structuring rate limiting in mobile routers 112, network 100 overhead and costs are more effectively reduced. It also allows this function to be performed without requiring the cooperation of the cellular carrier company.

One embodiment of a mobile router 112, comprises: a wireless wide area network interface 444 to access a cellular network 120 and operable to receive download data; a memory 442 comprising a data rate limiting rule 595; and a processor 440. Processor 440 utilizing communications agent 513 is operable to generate usage data based on the quantity of the download data during a predetermined time period and controls the data rate of downloaded data based on the usage data and the data rate limiting rule 595.

The data rate limiting rule 595 is received via the wide area network interface 444. Data rate limiting rule 595 comprises at least one predetermined accumulated data quantity and a corresponding second data rate.

Processor 440 controls the data rate for downloaded data at a first data rate to receive downloaded data unless the usage data exceeds the predetermined accumulated data quantity during the predetermined time period. Processor 440 then operates mobile router 112 at the second data rate subsequent to the usage data exceeding the predetermined accumulated data quantity during the predetermined time period. The second data rate is slower than the first data rate.

In various embodiments, a plurality of data rate limiting rules 595 may be utilized in each mobile router 112. The plurality of data rate limiting rules 595 is received via the wide area network interface 444. The plurality of data rate limiting rules 595 comprise at least a first data quantity and a corresponding second data rate, and a second data quantity and a third data rate.

Processor 440, utilizing communications agent 513, controls the data rate of downloading download data at a first data rate unless the accumulated usage data exceeds the first data quantity during the predetermined time period. Processor 440, utilizing communications agent 513 controls the data rate of downloading the download data at the second data rate subsequent to the accumulated usage data exceeding the first data quantity during the predetermined time period.

Processor 440, utilizing communications agent 513, controls the data rate of downloading the download data at the second slower data rate to receive the download data unless the accumulated usage data usage data exceeds the second data quantity during the predetermined time period. Processor 440, utilizing communications agent 513, controls the data rate of downloading the download at the third data rate subsequent to the accumulated usage data exceeding the second data quantity during the predetermined time period. The third data rate is slower than the second data rate.

Processor 440, utilizing communications agent 513, accumulates the total quantity of the transferred data, compares the accumulated total quantity to the accumulated transferred quantities, and utilizes the comparison to select a data rate for subsequent data transfers. Processor 440 resets the accumulated total quantity and the data rate at the end of the predetermined period.

Processor 440 controls the download data rate at a first data rate until one of the data rate limiting rules 595 is triggered. Processor 440 accumulates a total quantity of the transferred data, compares the accumulated total quantity to the accumulated transferred quantities, and utilizes the comparison step to select a second and slower data rate for subsequent data transfers.

Processor 440 is operable at the end of a predetermined period to reset the data rate for subsequent data transfers to the first data rate. The predetermined period is a billing period determined by the service provider.

Turning now to FIG. 8, a method in accordance with the principles of the invention is shown. At step 801 a network 100 comprising a plurality of mobile routers 112 is provided. At step 803 at least one server or network operations center 141 is provided as part of network 100. Network operations center 141 downloads data rate limiting rules to mobile routers 112 at step 805.

At step 807 each mobile router 112 stores its corresponding data rate limiting rule. Each data rate limiting rule comprises one or more data quantities and a corresponding data rate. Each mobile router 112 utilizes the data rate limiting rule to control the data rate of data subsequently transferred via cellular network 120 for the remainder of a predetermined time period. The predetermined time period is typically the service provider's billing period.

The data rate information comprises one or more predetermined conditions for changing the data rate. The predetermined conditions comprise accumulated download data quantities.

At step 809, data is initially downloaded to mobile router 112 at a first data rate.

Mobile router 112 monitors the download data and accumulates the total quantity of downloaded data at step 811.

At step 813, mobile router 112 compares the download data quantity or quantities of the data rate limiting rule to the accumulated total download data to determine the desired download data rate for subsequent data downloads.

At step 815, mobile router 112, utilizes the results of the comparison to control the download data rate for subsequent data downloads. If the accumulated total download data is less than all download data quantities in the data rate limiting rule, data is downloaded at a maximum data rate.

At step 817, it is determined that the accumulated download data exceeds a first data quantity in said data rate limiting rule. Subsequent downloads are controlled to a slower second data rate corresponding to the first data quantity in the data rate limiting rule at step 819.

Mobile router 112 continues to download data at a slower second data rate for the duration of the predetermined time period. The method may comprise resetting the accumulated total quantity and the data rate at the end of a predetermined period.

At step 821, mobile router 112 determines that the predetermined time period is at an end. Mobile router 112 resets the accumulated data quantity to zero at step 823 and also resets the data rate for downloads to its maximum data rate.

In another embodiment, mobile router 112 may receive a predetermined first command from network operation center 141 via cellular network 120. Mobile router 112 responds to the predetermined first command such that download data is subsequently downloaded at a predetermined rate. Mobile router 112 may receive a predetermined second command from network operations center 141. Mobile router 112 responds to the predetermined second command to such that data is again downloaded at the first data rate.

The commands received from network operations center 141 may include data rate information that mobile router 112 utilizes to control the data rate of data subsequently transferred via the cellular network.

The data rate information may comprise one of: a command to the router to change the data rate to a predetermined data rate, and one or more rate limiting rules based upon the accumulated quantity of data during a predetermined period.

The rate limiting rules are based upon a subscription data plan.

The method may comprise providing each plurality of data rate limiting rules with a plurality of accumulated data quantity limits and a corresponding plurality of data rates.

The method may comprise: providing a plurality of wireless mobile routers; each of the mobile routers comprising a wide area network wireless interface to access a cellular network, each the mobile routers operable to upload data and to download data via the cellular network; operating each mobile router to control its data throughput via the cellular network at a first data rate; providing at least one server coupleable to the plurality of wireless mobile routers via the cellular network; operating the server to selectively download to each of the mobile routers one or more corresponding predetermined data rates; and operating each mobile router to change its data throughput data rate from the first data rate to one of the one or more predetermined data rates upon the occurrence of a corresponding predetermined condition.

The method may comprise selecting the one or more predetermined data rates are each selected to be slower than the first data rate.

The method may comprise operating the server to determine each the corresponding predetermined condition.

The method may comprise selecting the corresponding predetermined condition to comprise a notification from the server to one or more mobile router of the plurality of mobile routers.

The method may comprise selecting the corresponding predetermined condition to comprise a predetermined accumulated data throughput quantity; operating each mobile router to accumulate data throughput quantity; and operating each mobile router to compare its accumulated data throughput quantity to the predetermined accumulated data throughput quantity.

When network operations center 141 performs remote software updates to a mobile router 112 or adds content to a mobile router 112 it is desirable to do so such that there is no interference with a mobile device 116 that is transferring data via network 100. In network 100, remote software updates occur in the background and the user of a mobile device 116 should never notice.

Updates and adding of content are performed by each mobile router 112 controlling its respective download data rate of the update or added content.

Each mobile router 112 monitors its link connection 122 for any data transfers, i.e., data packets sent or received. Mobile router 112 also checks to see if any Wi Fi devices, such as mobile device 116, users or applications are coupled to it via LAN network 115. If there is no activity via LAN network 115 then the software update download will proceed at a maximum speed that network 100 is capable of supporting. If mobile router 112 determines that activity is occurring on LAN network 115, the software update download will proceed at a predetermined limited data rate. The predetermined limited data rate is controlled by mobile router 112. The predetermined limited data rate is configured for each mobile router by network operations center 141, and is set depending upon the importance of the software update. For example, a critical software bug fix might get a higher priority than an advertising update. A traffic update might get a high priority than an entertainment news update. Any user, device or application activity is given network priority over a software update download. This will typically allow the software update download to continue, but the download data rate will be slowed down to a speed that the user would not notice, e.g., 20 kbps.

Processor 440 utilizing link monitor 452 monitors the wide area network interface to determine if data is being transferred and the priority of download data, and utilizes client agent 405 to monitor the local area network interface to determine if data is being transferred. Data priority information and data rate configuration information are received from network operations center 141 via wide area network interface and third apparatus to control the data rate for downloaded data based on the priority and the data rate configuration information.

The data rate configuration information may be received via the wide area network interface 444 and stored in memory 596.

Data rate configuration information assigns one or more lower priorities to data downloads of one or more corresponding predetermined types and assigns a higher priority to data transfers initiated by a device coupled to the local area network interface.

Processor 440 utilizing controls the data rate of the download data based on the predetermined priority of the download data, priority information and the data rate configuration information when data is being transferred via the local area network interface. The data rate of the download data is at a maximum data rate when data is not being transferred via the local area network interface.

The data rate for the download data is controlled based on whether data is transferred via local area network interface. The third apparatus controls the data rate for the download data to be a maximum data rate when no data is transferred via the local area network interface 446.

Each data download of one or more predetermined types is assigned one or more corresponding lower priorities. Data transfers comprising data of a second predetermined type with a device, such as mobile device 116, coupled to the local area network 446 interface is assigned a higher priority.

The data rate configuration information is selected such that the data rates corresponding to the one or more lower priorities are slower that the data rate corresponding to the data transfers.

In the embodiment, data downloads comprising one of software updates or added content have lower priorities.

Turning now to FIG. 9, the steps of an embodiment of a method of network 100 and mobile router 112 are shown.

At step 901, network operations center 141 downloads priority information and corresponding data rate information to mobile router 112. The priority information is associated with predetermined types of download data, e.g. software updates. Mobile router 112 stores the priority information and data rate configuration information in memory 595.

At step 905, processor 440 of mobile router 112, upon receiving download data, determines the priority of the download data.

In addition, at step 906, processor 440 monitors local area network interface 446 to determine if data is being transferred via local area network 115. At step 907, processor 440 controls the data rate for the download data based on the download data priority, the priority information, the data rate configuration information, and whether data is being transferred via the local area network interface.

The data rate of the download data is set at a maximum data rate when data is not being transferred via the local area network interface. The priority information is selected such that data downloads of one or more predetermined types are assigned one or more corresponding lower priorities and data transfers initiated by a device coupled to the local area network interface is assigned a higher priority.

It will be appreciated by those skilled in the art that various changes and modifications may be made to the embodiments described herein without departing from the spirit or scope of the invention. It is intended that the invention not be limited in any way by the embodiments shown and described herein, but that the invention be limited only by the claims appended hereto.

The invention claimed is:

1. A mobile router, comprising:
 a wireless wide area network interface to access a cellular network and operable to receive downloaded data;
 a memory, said memory comprising a data rate limiting rule, said data rate limiting rule is received via said wide area network interface, said data rate limiting rule comprises a data quantity and a second data rate;

a processor, said processor operates said mobile router to download said downloaded data at a first data rate;

said processor is operable to generate usage data based on the quantity of said downloaded data during a predetermined time period, and is operable to control the data rate of downloaded data based on said usage data and said data rate limiting rule;

said processor operates said mobile router at said first data rate to receive said downloaded data unless said usage data exceeds said data quantity during said predetermined time period; and said processor operates said mobile router at said second data rate subsequent to said usage data exceeding said data quantity during said predetermined time period.

2. A mobile router in accordance with claim 1, wherein:
said second data rate is slower than said first data rate.

3. A mobile router, comprising:
a wireless wide area network interface to access a cellular network to receive download data;
a memory, said memory comprising a plurality of data rate limiting rules, said plurality of data rate limiting rules are received via said wireless wide area network interface, said plurality of data rate limiting rules comprise at least a first data quantity and a corresponding second data rate, and a second data quantity and a third data rate; and
a processor;
said processor is operable to generate usage data based on the quantity of said download data during a predetermined time period;
said processor is operable to control the data rate of download data based on said usage data and said plurality of data rate limiting rules;
said processor is operable to control downloading of said download data at a first data rate;
said processor controls the downloading of said download data at said first data rate unless said usage data usage data exceeds said first data quantity during said predetermined time period; and
said processor controls the downloading of said download data at said second data rate subsequent to said usage data exceeding said first data quantity during said predetermined time period.

4. A mobile router in accordance with claim 3, wherein:
said second data rate is slower than said first data rate.

5. A mobile router in accordance with claim 4, comprising:
said processor controls the downloading of said download data at said second data rate unless said usage data usage data exceeds said second data quantity during said predetermined time period; and
said processor controls the downloading of said download data at said third data rate subsequent to said usage data exceeding said second data quantity during said predetermined time period.

6. A mobile router in accordance with claim 5, wherein:
said third data rate is slower than said second data rate.

7. A mobile router comprising:
a wireless wide area network interface to access a cellular network;
a data rate limiting rule comprising one or more predetermined conditions for changing said data rate, said predetermined conditions comprise accumulated transferred data quantities;
a processor operable to utilize said data rate limiting rule to control the data rate of data transferred via said cellular network, said processor accumulates a total quantity of said transferred data, compares said accumulated total quantity to said accumulated transferred quantities, and utilizes said comparison to select a data rate for subsequent data transfers, said processor resetting said accumulated total quantity and said data rate at the end of a predetermined period.

8. A mobile router in accordance with claim 7, comprising:
said processor controls said data rate at a first data rate until said data rate limiting rule is triggered.

9. A mobile router in accordance with claim 7, comprising:
said processor resets said data rate to said first data rate at the end of said predetermined period.

10. A mobile router in accordance with claim 7, comprising:
said processor initially controls transfer of said data at a first data rate.

11. A mobile router in accordance with claim 10, wherein:
said data rate information comprises a second data rate for transferring said data.

12. A mobile router in accordance with claim 11, wherein:
said second data rate is a predetermined slower data rate.

13. A mobile router receiving data services from a service provider via a cellular network provided by a cellular network carrier, said mobile router comprising:
a wireless wide area network interface to access a cellular network;
a processor operable to control the data rate of data transferred via said cellular network;
data rate information received from said service provider, said data rate information comprises one or more data rates that are slower than said first data rate, said data rate information comprises one or more data quantities and corresponding one or more second data rates;
said processor is operable to initially control said data rate at a first data rate;
said processor is operable to utilize said data rate information to determine the data rate of data subsequently transferred via said cellular network; and
said processor is operable to accumulate the quantity of data transferred via said cellular network, compare said accumulated quantity to each of said one or more data quantities, and control the data rate of data transferred subsequent to said accumulated quantity exceeding one of said one or more data quantities to the corresponding one of said one or more second data rates.

14. A mobile router in accordance with claim 13, comprising:
said processor is operable at the end of a predetermined period to reset said data rate for subsequent data transfers to said first data rate.

15. A mobile router in accordance with claim 14, wherein:
said predetermined period is a billing period determined by said service provider.

16. A mobile router in accordance with claim 14, comprising:
said predetermined period is a recurring time period.

17. A mobile router in accordance with claim 16, comprising:
said predetermined period is determined by said service provider.

18. A mobile router in accordance with claim 13, comprising:
a memory comprising said data rate information.

* * * * *